(12) United States Patent
Kitahara

(10) Patent No.: US 8,970,957 B2
(45) Date of Patent: Mar. 3, 2015

(54) TUNABLE INTERFERENCE FILTER, OPTICAL MODULE, AND ELECTRONIC DEVICE

(75) Inventor: Koji Kitahara, Ina (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/397,948

(22) Filed: Feb. 16, 2012

(65) Prior Publication Data

US 2012/0212822 A1    Aug. 23, 2012

(30) Foreign Application Priority Data

Feb. 17, 2011   (JP) ................. 2011-031847

(51) Int. Cl.
G02B 27/00 (2006.01)
G01J 3/26 (2006.01)
G01J 3/51 (2006.01)
G02B 26/00 (2006.01)

(52) U.S. Cl.
CPC .... G01J 3/26 (2013.01); G01J 3/51 (2013.01); G02B 26/001 (2013.01)
USPC .......................................... 359/578; 359/577

(58) Field of Classification Search
USPC ............................ 359/581, 587, 589, 578, 585
See application file for complete search history.

(56) References Cited

U.S. PATENT DOCUMENTS

| | | | |
|---|---|---|---|
| 6,421,188 B1 * | 7/2002 | Maehara ................... | 359/741 |
| 7,106,514 B2 | 9/2006 | Murata et al. | |
| 7,483,211 B2 | 1/2009 | Nakamura et al. | |
| 7,515,325 B2 | 4/2009 | Nakamura | |
| 2005/0068627 A1 | 3/2005 | Nakamura et al. | |
| 2005/0100269 A1 | 5/2005 | Ishizuya et al. | |
| 2006/0125879 A1 | 6/2006 | Fujii et al. | |
| 2006/0222821 A1 | 10/2006 | Masai | |
| 2008/0286890 A1 * | 11/2008 | Kikkawa et al. ................. | 438/30 |
| 2010/0142067 A1 * | 6/2010 | Hanamura et al. ............ | 359/850 |

FOREIGN PATENT DOCUMENTS

| | | |
|---|---|---|
| JP | 2001-221913 A | 8/2001 |
| JP | 2004-004547 A | 1/2004 |
| JP | 2005-009206 | 4/2005 |
| JP | 2005-309174 | 11/2005 |
| JP | 3786106 | 3/2006 |
| JP | 2006-235606 | 9/2006 |
| JP | 2006-271183 A | 10/2006 |
| JP | 2006-286971 A | 10/2006 |
| JP | 2007-219484 | 8/2007 |
| JP | 2008-076749 | 4/2008 |
| JP | 2009-134028 | 6/2009 |
| JP | 2009134028 A * | 6/2009 |

* cited by examiner

*Primary Examiner* — Thomas K Pham
*Assistant Examiner* — Sharrief Broome
(74) *Attorney, Agent, or Firm* — Harness, Dickey & Pierce, P.L.C.

(57) ABSTRACT

An etalon (tunable interference filter) includes a fixed substrate, a movable substrate facing the fixed substrate, a fixed reflection film disposed on the fixed substrate, a movable reflection film disposed on the movable substrate and facing the fixed reflection film via a gap, a fixed electrode disposed on the fixed substrate, and a movable electrode disposed on the movable substrate and facing the fixed electrode. A movable insulating film is stacked on a surface of the movable electrode on the side of the fixed electrode, the movable electrode has a compressive stress, and the movable insulating film has a tensile stress.

7 Claims, 10 Drawing Sheets

TUNABLE INTERFERENCE FILTER, OPTICAL MODULE, AND ELECTRONIC DEVICE

BACKGROUND

1. Technical Field

The present invention relates to a tunable interference filter which selects light at a desired objective wavelength from incident light to emit the selected light, an optical module including the tunable interference filter, and an electronic device including the optical module.

2. Related Art

In the related art, a tunable interference filter has been known in which multiple interference of light is caused between a pair of reflection films to emit light at a desired wavelength (for example, refer to JP-A-2008-76749 (Patent Document 1)).

An optical filter device (tunable interference filter) disclosed in Patent Document 1 has a first substrate and a second substrate arranged to face each other, an optical reflection film disposed on a surface of the first substrate facing the second substrate, and a mirror layer disposed on a surface of the second substrate facing the first substrate.

In the first substrate, an oxide film is formed along the circumference of the surface of the first substrate, and the optical reflection film is formed on a diaphragm supported by the oxide film. That is, a gap is formed between the first substrate and the diaphragm. An electrode is disposed on each of the surfaces of the first substrate and the diaphragm. When a voltage is applied between the electrodes, the diaphragm deflects to the side of the first substrate due to electrostatic attraction, so that a gap dimension between the optical reflection film and the mirror layer changes. Thus, by controlling the voltage between the electrodes, the tunable interference filter can extract light at a wavelength corresponding to the gap dimension between the mirrors from incident light.

In such a tunable interference filter that is disclosed in Patent Document 1, an electrode is disposed on a diaphragm. As the electrode, a film-like electrode is generally used. When such an electrode is deposited, an internal stress acts in the plane direction (direction along a substrate surface of the diaphragm) of the film. The direction or size of the internal stress is determined by a depositing method, a film material, and the like. When the internal stress acts in a direction toward the central portion of the film, the internal stress is a compressive stress. When the internal stress acts from the central portion of the film of the electrode to the outside, the internal stress is a tensile stress. Here, when a compressive stress acts on the electrode formed on the diaphragm, the diaphragm deflects toward the first substrate. When a tensile stress acts on the electrode formed on the diaphragm, the diaphragm deflects in a direction away from the first substrate.

When the diaphragm deflects due to the internal stress of the electrode in this manner, the optical reflection film also deflects according to the deflection of the diaphragm. Therefore, in an initial state where a driving voltage is not applied between the electrodes, it is sometimes impossible to maintain parallelism between the optical reflection film and the mirror layer, causing a problem that the resolution of the tunable interference filter is reduced.

SUMMARY

An advantage of some aspects of the invention is to provide a tunable interference filter in which the deflection caused in a substrate is reduced, an optical module, and an electronic device.

An aspect of the invention is directed to a tunable interference filter including: a first substrate; a second substrate facing the first substrate; a first reflection film disposed on a surface of the first substrate, the surface facing the second substrate; a second reflection film disposed on a surface of the second substrate and facing the first reflection film via a gap, the surface facing the first substrate; a first electrode disposed on the surface of the first substrate, the surface facing the second substrate; a second electrode disposed on the surface of the second substrate and facing the first electrode via a gap, the surface facing the first substrate; and an insulating film stacked on the first electrode, wherein a direction of an internal stress of the first electrode relative to a plane direction along a substrate surface of the first substrate is opposite to a direction of an internal stress of the insulating film relative to the plane direction.

In the aspect of the invention, the direction of the internal stress of the first electrode disposed on the first substrate is opposite to the direction of the internal stress of the insulating film stacked on the first electrode. Therefore, the internal stresses of them can be cancelled out each other.

Specifically, on the first substrate, force deflecting the first substrate to the side of the second substrate acts by a compressive stress of the first electrode, and force deflecting the first substrate to the side away from the second substrate acts by a tensile stress of the insulating film. Accordingly, since the respective forces act in the opposite directions, the forces cancel out each other to reduce the forces deflecting the first substrate. Thus, since the deflection of the first substrate is reduced, the deflection of the first reflection film disposed on the first substrate can also be reduced. Therefore, the accuracy of parallelism between the first reflection film and the second reflection film is improved, making it possible to improve the resolution of the tunable interference filter.

When the tunable interference filter is manufactured, the dimension of the gap between the first reflection film and the second reflection film is set to a set value (initial gap dimension) in an initial state where a driving voltage is not applied between the first electrode and the second electrode. In this case, when the first substrate is deflected, there is a problem that the gap dimension cannot be precisely set to the initial gap dimension. In contrast, since the deflection of the first substrate is reduced in the aspect of the invention, the gap between the first reflection film and the second reflection film can be accurately adjusted to the initial gap dimension.

In the tunable interference filter according to the aspect of the invention, it is preferable that the absolute value of the product of the internal stress, film thickness dimension, and area of the first electrode is the same as that of the product of the internal stress, film thickness dimension, and area of the insulating film.

Force exerted on the substrate by the internal stress of the film formed on the substrate is proportional to the product of the magnitude of the internal stress of the film, the film thickness dimension, and the area of the film.

When the absolute value of the product of the magnitude of compressive stress, film thickness dimension, and area of the first electrode is the same as that of the product of the magnitude of tensile stress, film thickness dimension, and area of the insulating film, the force exerted on the first substrate by the first electrode is balanced by the force exerted on the first substrate by the insulating film. Therefore, the deflection of the first substrate due to the internal stress of the first electrode is prevented. Thus, the first reflection film and the second reflection film are maintained parallel, making it possible to further improve the resolution of the tunable interference filter.

In the tunable interference filter according to the aspect of the invention, it is preferable that the insulating film is a film made of a high-k material.

Generally, a high-k material has a high relative dielectric constant and excellent dielectric strength. Because of the high relative dielectric constant, the electrostatic attractive force acting between the first electrode and the second electrode can be improved. In this manner, both the electrostatic attractive force and the dielectric strength can be improved.

In the tunable interference filter according to the aspect of the invention, it is preferable that the insulating film is formed of a plurality of layers.

In the aspect of the invention, since an insulating film can be formed of a plurality of layers having different characteristics, an insulating film more excellent in performance can be formed. For example, even in examples of the high-k material described above, some high-k materials have somewhat low dielectric strength although they have a high relative dielectric constant, depending on the kinds of the high-k material. Accordingly, by stacking a film made of such a material and a film made of a material having excellent dielectric strength, both the electrostatic attractive force and the dielectric strength can be made excellent. A $SiO_2$ film generally used as an insulating film has excellent dielectric strength and is inexpensive. Therefore, the $SiO_2$ film may be stacked on a film made of a high-k material having a high relative dielectric constant. By changing the combination of layers in this manner, the performance of an insulating film can be adjusted.

Another aspect of the invention is directed to an optical module including: the tunable interference filter described above and a detecting section which detects light transmitted through the tunable interference filter.

In the aspect of the invention, the deflection of the first substrate or the first reflection film due to the internal stress of the first electrode is reduced in the tunable interference filter as described above. Therefore, the accuracy of parallelism between the first reflection film and the second reflection film is improved, so that a high resolution can be realized. Accordingly, in the optical module including such a tunable interference filter, it is possible to receive, with the detecting section, light at a desired wavelength extracted with a high resolution, so that the amount of the light at a desired wavelength can be precisely detected.

Still another aspect of the invention is directed to an electronic device including the optical module described above.

Examples of the electronic device can include a light measuring instrument which analyzes the chromaticity, brightness, or the like of light incident on the interference filter based on the amount of light detected by the optical module described above, a gas detecting device which detects the absorption wavelength of gas to examine the kind of the gas, and an optical communication device which acquires, from received light, data included in the light at the wavelength.

In the aspect of the invention, since the amount of light at a desired wavelength can be precisely detected by the optical module as described above, the electronic device can precisely carry out a photoanalysis process based on such precise data.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described based on the drawings.

1. Overall Configuration of Colorimetric Device

Figure 1:
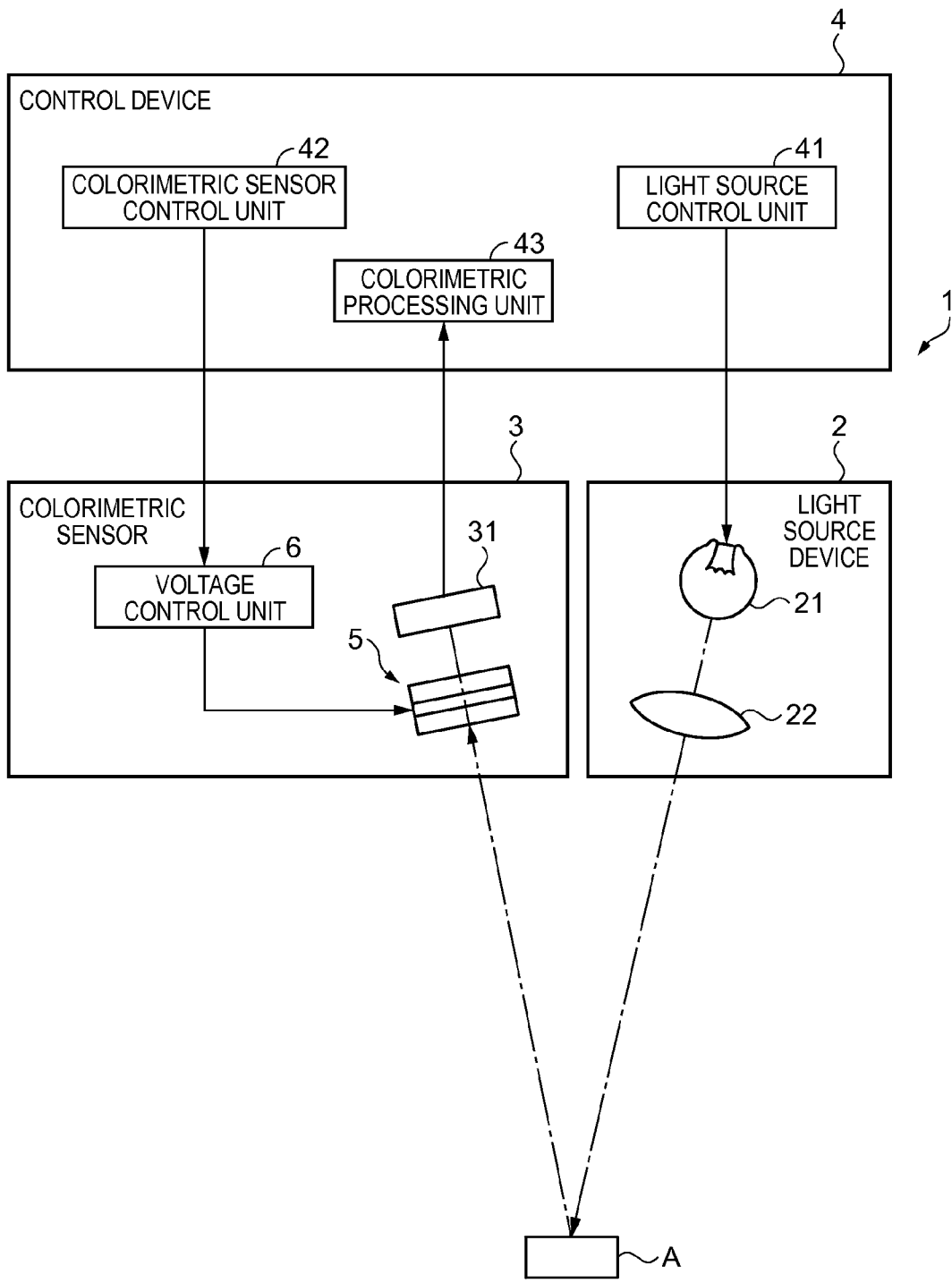
FIG. 1 shows a schematic configuration of a colorimetric device of a first embodiment according to the invention.

FIG. 1 shows a schematic configuration of a colorimetric device (electronic device) of the embodiment according to the invention.

The colorimetric device 1 is an electronic device according to the invention. As shown in FIG. 1, the colorimetric device 1 includes a light source device 2 which emits light to a test object A, a colorimetric sensor 3 as an optical module according to the invention, and a control device 4 which controls overall operation of the colorimetric device 1. The colorimetric device 1 causes light emitted from the light source device 2 to be reflected by the test object A, receives the reflected test object light with the colorimetric sensor 3, and analyzes, based on a detection signal output from the colorimetric sensor 3, the chromaticity of the test object light, that is, the color of the test object A to measure the color.

2. Configuration of Light Source Device

The light source device 2, which includes a light source 21 and a plurality of lenses 22 (only one lens is illustrated in FIG. 1), emits white light toward the test object A. The plurality of lenses 22 may include a collimator lens. In this case, the light source device 2 makes the white light emitted from the light source 21 parallel light with the collimator lens and emits the parallel light from a projection lens (not shown) toward the test object A.

In the embodiment, the colorimetric device 1 including the light source device 2 is exemplified. However, for example, when the test object A is a light emitting member such as a liquid crystal panel, the colorimetric device 1 may not be provided with the light source device 2.

3. Configuration of Colorimetric Sensor

The colorimetric sensor 3 constitutes the optical module according to the invention. As shown in FIG. 1, the colorimetric sensor 3 includes an etalon 5 which constitutes a tunable interference filter according to the invention, a detecting section 31 which receives and detects light transmitting through the etalon 5, and a voltage control section 6 which varies the wavelength of the light to be transmitted through the etalon 5. Moreover, the colorimetric sensor 3 includes, at a position facing the etalon 5, an incident optical lens (not shown) which introduces the reflected light (test object light) reflected by the test object A to the inside of the colorimetric sensor. The calorimetric sensor 3 disperses, with the etalon 5, only a light at a predetermined wavelength of the test object light incident from the incident optical lens and receives the dispersed light with the detecting section 31.

The detecting section 31 is composed of a plurality of photoelectric conversion elements and generates an electric signal corresponding to the amount of light received. The detecting section 31 is connected to the control device 4 and outputs, as a light receiving signal, the generated electric signal to the control device 4.

3-1. Configuration of Etalon

Figure 2:
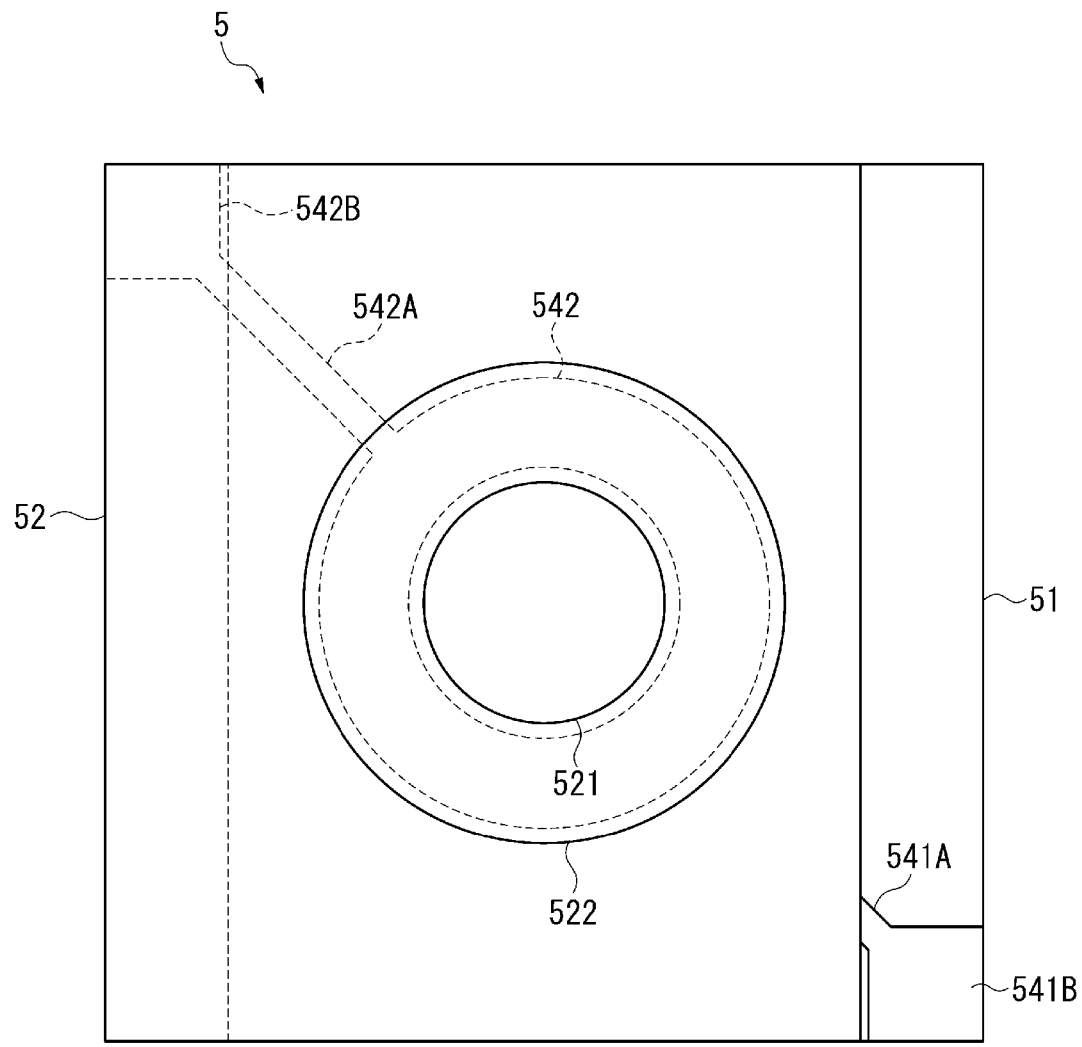
FIG. 2 is a plan view showing a schematic configuration of an etalon as a tunable interference filter of the first embodiment.
Figure 3:
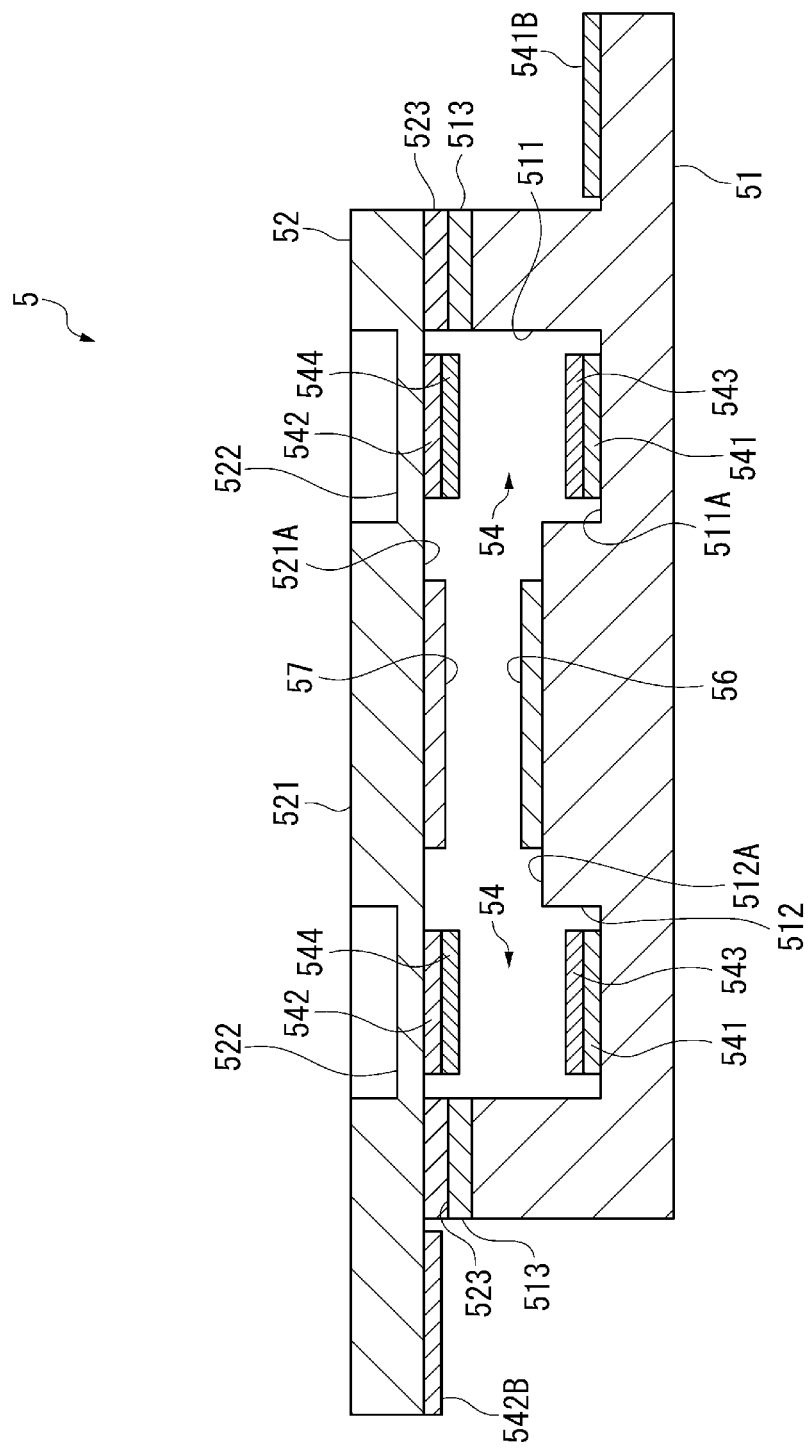
FIG. 3 is a cross-sectional view showing a schematic configuration of the etalon of the first embodiment.

FIG. 2 is a plan view showing a schematic configuration of the etalon 5 constituting the tunable interference filter according to the invention. FIG. 3 is a cross-sectional view showing a schematic configuration of the etalon 5.

As shown in FIG. 2, the etalon 5 is a square planar plate-shaped optical member with a side of, for example, 10 mm. As shown in FIG. 3, the etalon 5 includes a fixed substrate 51 as a second substrate according to the invention and a movable substrate 52 as a first substrate according to the invention. These two substrates 51 and 52 are each formed of any of various types of glass such as, for example, soda glass, crystalline glass, silica glass, lead glass, potassium glass, borosilicate glass, or alkali-free glass, quartz, or the like. These two substrates 51 and 52 are bonded together at bonding portions 513 and 523 described later by, for example, room-temperature surface activated bonding, siloxane bonding using a plasma-polymerized film, or the like, thereby being configured integrally.

A fixed reflection film 56 constituting a second reflection film according to the invention is disposed on the fixed substrate 51, and a movable reflection film 57 constituting a first reflection film according to the invention is disposed on the movable substrate 52. The fixed reflection film 56 is fixed to a surface of the fixed substrate 51 facing the movable substrate 52, and the movable reflection film 57 is fixed to a surface of the movable substrate 52 facing the fixed substrate 51. Moreover, the fixed reflection film 56 and the movable reflection film 57 are arranged to face each other via a gap.

Further, an electrostatic actuator 54 for controlling the dimension of the gap between the fixed reflection film 56 and the movable reflection film 57 is disposed between the fixed substrate 51 and the movable substrate 52. The electrostatic actuator 54 includes a fixed electrode 541, as a second electrode according to the invention, disposed on the side of the fixed substrate 51 and a movable electrode 542, as a first electrode according to the invention, disposed on the side of the movable substrate 52.

3-1-1. Configuration of Fixed Substrate

The fixed substrate 51 is formed by processing a glass base material formed to a thickness of, for example, 500 μm. Specifically, as shown in FIG. 3, an electrode forming groove 511 and a reflection film fixing portion 512 are formed by etching in the fixed substrate 51. The fixed substrate 51 is formed to have a great thickness dimension relative to the movable substrate 52, and the deflection of the fixed substrate 51 is not caused by electrostatic attraction when a voltage is applied between the fixed electrode 541 and the movable electrode 542, or the internal stress of the fixed electrode 541.

The electrode forming groove 511 is formed to have an annular shape centered at the central point of the plane in a plan view (hereinafter referred to as "etalon plan view") viewed in a thickness direction of the etalon 5 as shown in FIG. 2. The reflection film fixing portion 512 is formed to protrude, in the plan view, from the central portion of the electrode forming groove 511 to the side of the movable substrate 52.

Moreover, an extraction forming groove extending from the electrode forming groove 511 toward an apical direction (for example, the lower right direction in FIG. 2) of the circumferential edge of the fixed substrate 51 is disposed in the fixed substrate 51.

On an electrode forming surface 511A as a groove bottom portion of the electrode forming groove 511 of the fixed substrate 51, the fixed electrode 541 having a ring shape is formed. The material of the fixed electrode 541 is not particularly limited as long as the material has conductivity and electrostatic attraction can be generated between the fixed electrode 541 and the movable electrode 542 by applying a voltage between the fixed electrode 541 and the movable electrode 542 of the movable substrate 52 described later. In the embodiment, however, an ITO film is used.

Moreover, a fixed extraction electrode 541A extending from the circumferential edge of the fixed electrode 541 along the extraction forming groove (the lower right direction in FIG. 2) is disposed. A fixed electrode pad 541B is formed at the tip of the fixed extraction electrode 541A. The fixed electrode pad 541B is connected to the voltage control section 6. The fixed extraction electrode 541A is formed at the same time when the fixed electrode 541 is deposited, and composed of an ITO film similarly to the fixed electrode 541.

On the fixed electrode 541, a fixed insulating film 543 for preventing discharge between the fixed electrode 541 and the movable electrode 542 is stacked. The fixed insulating film 543 is composed of, for example, an insulating member such as $SiO_2$ and covers a surface of the fixed electrode 541 facing the movable substrate 52. The film thickness dimension of the fixed insulating film 543 is not particularly limited, and it is sufficient that the dimension is set according to a required dielectric strength.

As described above, the reflection film fixing portion 512 is formed coaxially with the electrode forming groove 511 so as to have a cylindrical shape with a diameter dimension smaller than that of the electrode forming groove 511. In the embodiment, as shown in FIG. 3, an example is shown in which a reflection film fixing surface 512A of the reflection film fixing portion 512 facing the movable substrate 52 is formed nearer to the movable substrate 52 than the electrode forming surface 511A. However, the invention is not limited to this. The height positions of the electrode forming surface 511A and the reflection film fixing surface 512A are appropriately set depending on the dimension of the gap between the fixed reflection film 56 fixed to the reflection film fixing surface 512A and the movable reflection film 57 formed on the movable substrate 52, the dimension between the fixed electrode 541 and the movable electrode 542, described later, disposed on the movable substrate 52, and the thickness dimension of the fixed reflection film 56 or the movable reflection film 57. For example, when a dielectric multilayer film is used as each of the reflection films 56 and 57 and its thickness dimension is increased, the electrode forming surface 511A and the reflection film fixing surface 512A may be formed to be flush with each other. Alternatively, a configuration may be adopted in which a reflection film fixing groove having a cylindrical recess-groove shape is formed at the central portion of the electrode forming surface 511A and the reflection film fixing surface 512A is formed on a bottom surface of the reflection film fixing groove.

However, electrostatic attraction acting between the fixed electrode 541 and the movable electrode 542 is inversely proportional to the square of the distance between the fixed electrode 541 and the movable electrode 542. Accordingly, the more the distance between the fixed electrode 541 and the movable electrode 542 decreases, the more the electrostatic attraction relative to an applied voltage increases. Therefore, the variation of the gap is also increased. Especially when the gap has a tiny variable dimension (for example, 250 nm to 450 nm) like the etalon 5 of the embodiment, it is hard to control the gap. Accordingly, even when the reflection film fixing groove is formed as described above, it is preferable to secure the depth dimension of the electrode forming groove 511 to some extent. In the embodiment, it is preferable to form the electrode forming groove 511 with a depth dimension of 1 μm, for example.

It is preferable for the reflection film fixing surface 512A of the reflection film fixing portion 512 to design its groove depth also in consideration of a wavelength range of light to be transmitted through the etalon 5. For example, when it is so set that an initial value (dimension of the gap in a state where a voltage is not applied between the fixed electrode 541 and the movable electrode 542) of the gap between the fixed reflection film 56 and the movable reflection film 57 is 450 nm, and that the movable reflection film 57 can be displaced by applying a voltage between the fixed electrode 541 and the movable electrode 542 until the gap is 250 nm for example, it is sufficient that the film thicknesses of the fixed reflection film 56 and the movable reflection film 57 and the height dimension of the reflection film fixing surface 512A or the electrode forming surface 511A are set to values with which the gap G can be displaced between 250 nm and 450 nm.

To the reflection film fixing surface 512A, the fixed reflection film 56 formed to have a circular shape is fixed. The fixed reflection film 56 may be formed of a metal single-layer film or a dielectric multilayer film. Further, the fixed reflection film 56 may have a configuration in which an Ag alloy is formed on a dielectric multilayer film. As a metal single-layer film, an Ag-alloy single-layer film, for example, can be used. In the case of a dielectric multilayer film, a dielectric multilayer film having, for example, $TiO_2$ as a high refractive layer and $SiO_2$ as a low refractive layer can be used. Here, when the fixed reflection film 56 is formed of a metal single layer such as an Ag-alloy single layer, a reflection film which can cover the entire range of visible light as a wavelength range which can be dispersed by the etalon 5 can be formed. Moreover, when the fixed reflection film 56 is formed of a dielectric multilayer film, the wavelength range which can be dispersed by the etalon 5 is narrower than that of an Ag alloy single-layer film, but the transmittance of the dispersed light is high and in addition, the full width half maximum of the transmittance is narrow, whereby a favorable resolution can be provided.

Further, the fixed substrate 51 has, on a lower surface on the side opposite to the upper surface facing the movable substrate 52, an antireflection film (AR) (not shown) formed at a position corresponding to the fixed reflection film 56. The antireflection film is formed by alternately stacking a low refractive index film and a high refractive index film. The antireflection film lowers the reflectance of visible light on the surface of the fixed substrate 51 and increases the transmittance.

3-1-2. Configuration of Movable Substrate

The movable substrate 52 is formed by processing a glass base material formed to a thickness of, for example, 200 μm using an etching process.

Specifically, the movable substrate 52 includes a movable portion 521 having a circular shape centered at the central point of the substrate in the plan view shown in FIG. 2, and a holding portion 522 formed coaxially with the movable portion 521 and holding the movable portion 521.

The movable portion 521 is formed to have a thickness dimension larger than that of the holding portion 522 and formed to have a thickness dimension of, for example, 200 μm which is the same thickness dimension as that of the movable substrate in the embodiment. Moreover, the movable portion 521 includes a movable surface 521A parallel to the reflection film fixing portion 512. To the movable surface 521A, the movable reflection film 57 facing the fixed reflection film 56 via the gap is fixed.

For the movable reflection film 57, a reflection film having the same configuration as that of the fixed reflection film 56 described above is used.

Further, the movable portion 521 has, on an upper surface on the side opposite to the movable surface 521A, an antireflection film (AR) (not shown) formed at a position corresponding to the movable reflection film 57. The antireflection film has a configuration similar to that of the antireflection film formed for the fixed substrate 51 and is formed by alternately stacking a low refractive index film and a high refractive index film.

The holding portion 522 is a diaphragm surrounding the periphery of the movable portion 521. The holding portion 522 is formed to have, for example, a thickness dimension of 50 μm, and its rigidity relative to the thickness direction is smaller than that of the movable portion 521. Therefore, the holding portion 522 is more likely to deflect than the movable portion 521, so that the holding portion 522 can be deflected to the side of the fixed substrate 51 by slight electrostatic attraction. In this case, since the movable portion 521 has a thickness dimension larger than that of the holding portion 522 and therefore has larger rigidity, the movable portion 521 does not substantially deflect even when force deflecting the movable substrate 52 acts due to electrostatic attraction, and the deflection of the movable reflection film 57 formed on the movable portion 521 can also be prevented.

On a surface of the holding portion 522 facing the fixed substrate 51, the movable electrode 542 having a ring shape and facing the fixed electrode 541 via a gap of about 1 μm is formed. A movable insulating film 544 is stacked on the movable electrode 542 on the side of the fixed electrode 541.

The movable electrode 542 has a compressive stress in which the direction of the internal stress acting along a plane direction is a compression direction from the circumferential edge of the movable electrode 542 toward the central portion. The movable insulating film 544 has a tensile stress in which the direction of the internal stress is a tensile direction from the central portion of the film toward the circumferential edge of the movable insulating film 544.

More specifically, the movable electrode 542 is a film formed by sputter depositing a metal oxide film. For example, in the embodiment, the movable electrode 542 is formed of ITO (Indium Tin Oxide) with a thickness dimension of 0.1 μm. When an ITO film is deposited by sputtering, the film stress is about 300-500 MPa. The movable electrode 542 composed of such a metal oxide has favorable adhesion to the movable substrate 52 formed of glass, so that the peeling off between the movable substrate 52 and the movable electrode 542 can be prevented. Moreover, a film formed of a metal oxide is a film having a compressive stress in a state of not being subjected to the post-treatment when the film is deposited by sputtering for example.

Examples of other metal oxide films exhibiting a compressive stress when the film is deposited by sputtering include, for example, IZO, ICO, IGO, IXO, and IWO. Further, the movable electrode 542 is not limited to a metal oxide, but DLC provided with conductivity, for example, may be used.

The movable insulating film 544 is a film formed of a high-k material having a high relative dielectric constant of 7.8 or more, such as $Al_2O_3$, by an atomic layer deposition (ALD) method. The movable insulating film 544 covers a surface of the movable electrode 542 facing the fixed substrate 51. Examples of a high-k material having a tensile stress includes, for example, SiON, $Al_2O_3$, $Ta_2O_5$, HfSiN, HfSiON, $HfO_x$, and $HfAlO_x$. The movable insulating film. 544 may be formed of a single layer of any of the materials described above, or may be formed of a plurality of layers. In the embodiment, a single layer of $HfAlO_x$ with a thickness of 0.1 μm is formed as the movable insulating film 544.

Here, when the internal stress of the movable electrode 542 deposited on the movable substrate 52 is $\sigma_1$, the film thickness dimension of the movable electrode is $t_1$, the area of the film of the movable electrode is $S_1$, the internal stress of the movable insulating film 544 is $\sigma_2$, the film thickness dimension of the movable insulating film is $t_2$, and the area of the film of the movable insulating film is $S_2$, force (bending moment) F of the movable electrode 542 causing the movable substrate 52 to deflect is represented by the following expression (1).

$$F \propto (\sigma_1 \times t_1 \times S_1) + (\sigma_2 \times t_2 \times S_2) \quad (1)$$

In the expression (1), when the force F is "0", the deflection of the movable substrate 52 due to the internal stress of the movable electrode 542 can be prevented. Here, the internal stress $\sigma_1$ is a positive value because the internal stress of the movable electrode 542 is a compressive stress, while the internal stress $\sigma_2$ is a negative value because the internal stress of the movable insulating film. 544 is a tensile stress. Accordingly, when F=0, the following expression (2) is established.

$$|\sigma_1 \times t_1 \times S_1| = |\sigma_2 \times t_2 \times S_2| \quad (2)$$

In the embodiment, the movable electrode 542 and the movable insulating film 544 satisfy the relation of the expression (2). Thus, the deflection of the movable substrate 52 due to the internal stress of the movable electrode 542 is prevented.

Here, characteristics obtained by forming insulating films using $Al_2O_3$, $HfO_2$, and $HfAlO_x$ as high-k materials on an ITO film by an atomic layer deposition (ALD) method and characteristics of silicon dioxide ($SiO_2$) used generally as an insulating film are shown in Table 1 below.

TABLE 1

| Insulating Film | Relative Dielectric Constant | Dielectric Strength (MV/cm) | Film Stress (MPa) |
|---|---|---|---|
| $Al_2O_3$ | 7.8-8.0 | 6 | 100-400 tensile (at time of a film thickness of 0.05 μm) |
| $HfO_2$ | 18.0-24.0 | 4 | 100-400 tensile (at time of a film thickness of 0.05 μm) |
| $HfAlO_x$ | 11 | 8 | 300-400 tensile (at time of a film thickness of 0.05 μm) |
| $SiO_2$ | 3.8 | 8 | 100-150 compressive (at time of a film thickness of 0.1 μm) |

When $SiO_2$ is used as an insulating film, the diaphragm is further deflected because the film stress is a compressive stress and therefore combined with the compressive stress of the movable electrode 542, so that the accuracy of the gap between the reflection films is worsened. Moreover, while the insulating film has excellent dielectric strength, the relative dielectric constant is low, thereby weakening electrostatic attractive force.

On the other hand, since $Al_2O_3$, $HfO_2$, and $HfAlO_x$ as high-k materials each have a high relative dielectric constant and excellent dielectric strength, it is possible to achieve compatibility between the dielectric strength and the electrostatic attractive force. Moreover, since the film stress is a tensile stress, the film stress (300-500 MPa) of the movable electrode 542 formed of an ITO film can be cancelled out, so that the deflection of the diaphragm can be prevented.

The movable insulating film 544 may be a single layer or a plurality of layers. The layer can be optionally selected or combined according to the deflection amount of the diaphragm, dielectric strength, and electrostatic attractive force. For example, by forming as the movable electrode 542 an ITO film to a thickness of 0.1 μm, then forming a $SiO_2$ film to a thickness of 0.05 μm, and further forming a $HfO_2$ film to a thickness of 0.05 μm, the stress can be cancelled out. Moreover, by stacking a $SiO_2$ film having high dielectric strength and a $HfO_2$ film having a high relative dielectric constant, the movable insulating film 544 excellent in dielectric strength and electrostatic attractive force can be provided. An $Al_2O_3$ film or a $HfAlO_x$ film may be stacked instead of a $HfO_2$ film.

A movable extraction electrode 542A is formed from a part of the circumferential edge of the movable electrode 542 toward the circumferential direction. Specifically, the movable extraction electrode 542A is disposed to extend, in the etalon plan view, in a direction opposite to the extraction forming groove formed in the fixed substrate 51. The movable extraction electrode 542A has a movable electrode pad 542B formed at the tip. The movable electrode pad 542B is connected to the voltage control section 6.

The movable extraction electrode 542A is formed at the same time when the movable electrode 542 is deposited, and has a configuration similar to that of the movable electrode 542. Since the movable extraction electrode 542A is deposited on the movable substrate 52 at a portion having a thickness dimension equal to that of the movable portion 521, even when force deflecting the movable substrate 52 acts due to electrostatic attraction, the portion at which the movable extraction electrode 542A is deposited is not deflected.

3-2. Configuration of Voltage Control Section

The voltage control section 6 controls, based on a control signal input from the control device 4, a voltage to be applied to the fixed electrode 541 and the movable electrode 542 of the electrostatic actuator 54.

4. Configuration of Control Device

The control device 4 controls overall operation of the colorimetric device 1.

As the control device 4, for example, a general-purpose personal computer, a personal digital assistant, a computer dedicated to colorimetry, or the like can be used.

As shown in FIG. 1, the control device 4 is configured to include a light source control section 41, a colorimetric sensor control section 42, and a colorimetric processing section 43.

The light source control section 41 is connected to the light source device 2. The light source control section 41 outputs, for example based on a setting input by a user, a predetermined control signal to the light source device 2 to cause the light source device 2 to emit white light having predetermined brightness.

The colorimetric sensor control section 42 is connected to the colorimetric sensor 3. The colorimetric sensor control section 42 sets, for example based on a setting input by a user, the wavelength of light to be received by the colorimetric sensor 3 and outputs to the colorimetric sensor 3 a control signal indicating that the amount of the received light at the wavelength should be detected. Thus, the voltage control section 6 of the colorimetric sensor 3 sets, based on the control signal, a voltage to be applied to the electrostatic actuator 54 so as to allow only light at a wavelength desired by a user to transmit.

The colorimetric processing section 43 analyzes the chromaticity of the test object A based on the amount of received light detected by the detecting section 31.

5. Method for Manufacturing Etalon

Next, a method for manufacturing the etalon 5 will be described based on the drawings.

5-1. Manufacture of Fixed Substrate

Figure 4A:
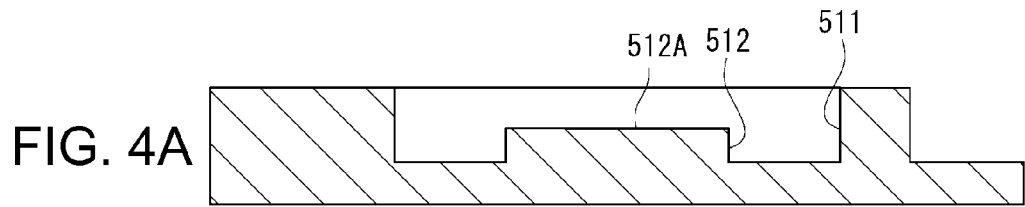
FIGS. 4A to 4E show the manufacturing process of a fixed substrate of the etalon of the first embodiment.

First, a silica glass substrate with a thickness dimension of 500 μm, as a raw material for manufacturing the fixed substrate 51, is prepared, and the silica glass substrate is finely polished on both surfaces until the surface roughness Ra is 1 nm or less. A resist for forming the electrode forming groove 511 is applied to the surface of the fixed substrate 51 facing the movable substrate 52, and the applied resist is exposed and developed by a photolithographic method to pattern a portion at which the electrode forming groove 511 is formed. The fixed substrate 51 is etched by wet etching to the depth dimension (for example, 1 μm) of the reflection film fixing surface 512A. A resist is formed on the reflection film fixing surface 512A, and further, an etching process (for example, 0.5 μm) is performed, so that the electrode forming groove 511 is formed as shown in FIG. 4A.

Next, an ITO film is deposited by sputtering so as to have a thickness dimension of 0.1 μm on the entire surface of the fixed substrate 51 on the side facing the movable substrate 52. A resist is applied onto the ITO film, and pattern formation is performed by a photolithographic method and etching. Thus, the fixed electrode 541, the fixed extraction electrode 541A, and the fixed electrode pad 541B are formed.

Figure 4B:
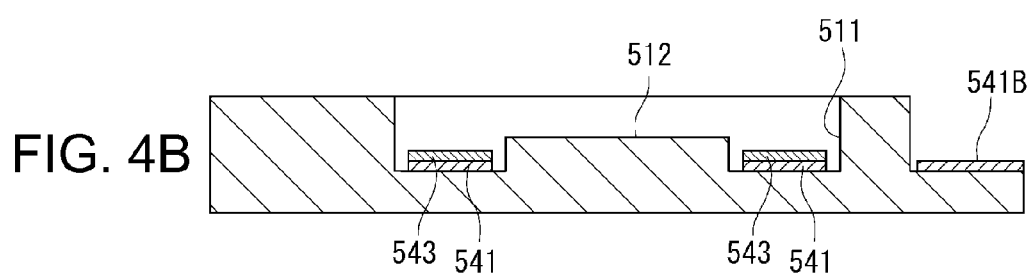

A metal mask or a silicon mask only exposing the fixed electrode 541 is aligned with and bonded to a surface of the fixed electrode 541 on the side of the movable substrate 52, the fixed insulating film 543 is deposited by an atomic layer deposition (ALD) method, and the mask is removed. As the fixed insulating film 543, a high-k material is used as described above. Thus, as shown in FIG. 4B, the fixed insulating film 543 is formed on the surface of the fixed electrode 541 on the side of the movable substrate 52.

Figure 4C:
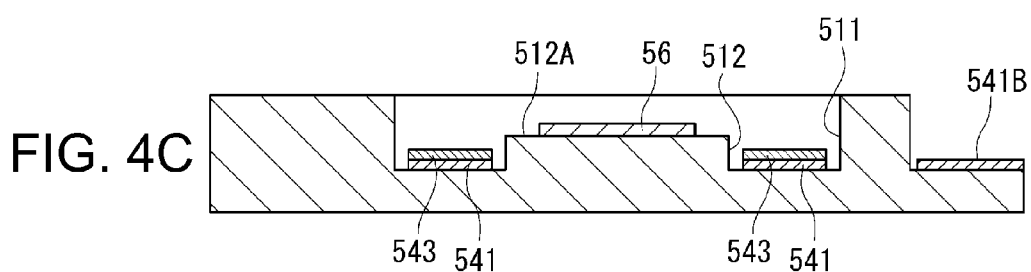

Next, the fixed reflection film 56 is deposited by sputtering or an evaporation method on the entire surface of the fixed substrate 51 on the side facing the movable substrate 52, a resist having a pattern covering only a region at which the fixed reflection film 56 is formed is formed on the reflection film fixing surface 512A, and pattern formation is performed by etching. Further, by removing the resist, the fixed reflection film 56 is formed on the reflection film fixing surface 512A as shown in FIG. 4C.

Figure 4D:
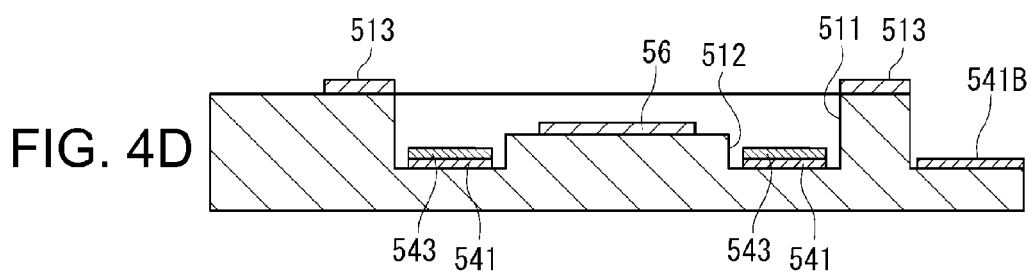

Thereafter, a metal mask or a silicon mask only exposing a region at which the bonding portion 513 is formed is aligned with the fixed substrate 51 and bonded to the fixed substrate 51, a plasma-polymerized film using polyorganosiloxane is deposited by a plasma CVD method so as to have a thickness dimension of 100 nm, and the mask is removed. Through the process described above, the bonding portion 513 is formed as shown in FIG. 4D.

Figure 4E:
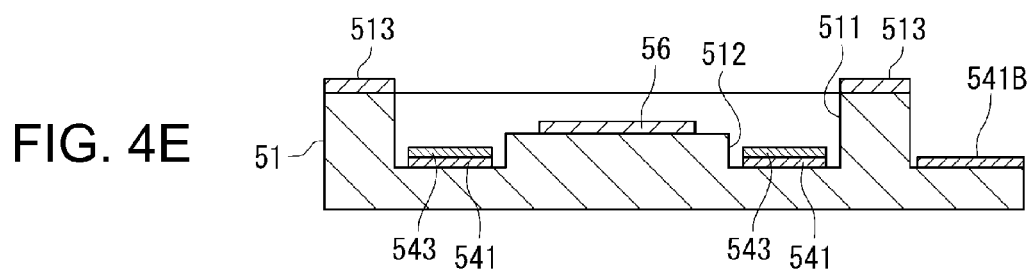

Then, a notch portion for taking out an electrode is formed by a sandblast method or a cutting method. Through the process described above, the fixed substrate 51 shown in FIG. 4E is formed.

5-2. Manufacture of Movable Substrate

In the formation of the movable substrate 52, deposition conditions of the movable electrode 542 and the movable insulating film 544 are previously set, and internal stresses obtained when the films are deposited under the deposition conditions are measured. For example, in the embodiment, the movable electrode 542 is deposited by sputtering. In this case, the deposition conditions of the movable electrode 542 are set, for example, as follows: the temperature of a deposition target substrate (the movable substrate 52) is 250 degrees, the pressure in the vacuum chamber is 0.5 Pa, and the power to be applied to a target is 200 W. The internal stress of the movable electrode 542 deposited by sputtering under the deposition conditions is measured. The movable insulating film 544 is deposited by an atomic layer deposition (ALD) method under the following deposition conditions: in a thermal CVD apparatus for example, vacuuming is performed at a temperature of a deposition target substrate of 250 degrees, a source gas is introduced for a given time, then excess gas is removed by purging, next $O_3$ gas is introduced for a given time, and this cycle is performed repetitively. As a source gas, TEMAH (tetrakis(N-ethyl methyl amino) halfnium) is used in the case of $HfO_2$, TMA (trimethyl aluminum) is used in the case of $Al_2O_3$, and TEMAH and $O_3$, and TMA and $O_3$ are alternately introduced repetitively in the case of $HfAlO_x$. The internal stress of the movable insulating film 544 deposited by the method described above is measured.

By simulation, the thickness dimensions of the movable electrode 542 and the movable insulating film 544 satisfying the expression (2) are determined. In this case, it is assumed that, by simulation, the thickness dimension of the movable electrode 542 is determined to be 0.1 μm and the thickness dimension of the movable insulating film 544 is determined to be 0.1 μm.

Figure 5A:
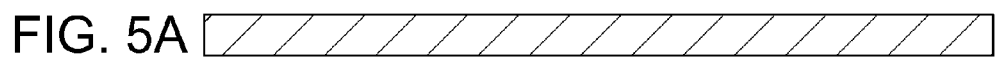
FIGS. 5A to 5G show the manufacturing process of a movable substrate of the etalon of the first embodiment.

Thereafter, a silica glass substrate with a thickness dimension of 200 μm, as a raw material for manufacturing the movable substrate 52, is prepared, and both surfaces of the glass substrate are finely polished until the surface roughness Ra thereof is 1 nm or less as shown in FIG. 5A.

Figure 5B:
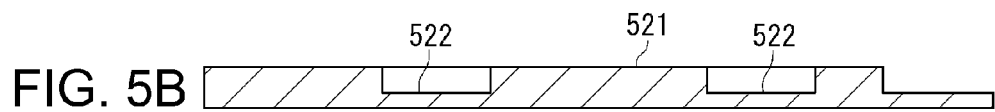

On both the surfaces of the glass substrate, a Cr film (a thickness dimension of 50 nm) and an Au film (a thickness dimension of 500 nm) are deposited by sputtering, a pattern for forming the holding portion 522 and a space above the fixed electrode pad 541B of the fixed substrate 51 is formed on the surface on the side opposite to the fixed substrate 51, and the Cr/Au film at the regions corresponding to the holding portion 522 and the space is removed. In this case, the Au film is etched using a mixture of iodine and potassium iodide, while the Cr film is etched using a ceric ammonium nitrate solution. Then, the glass substrate is immersed in a hydrofluoric acid solution, so that the holding portion 522 and the space above the fixed electrode pad 541B of the fixed substrate 51 are etched by 170 μm and the Cr/Au film left on both the surfaces of the glass substrate is peeled off. Thus, as shown in FIG. 5B, the movable portion 521 and the holding portion 522 with a thickness of 30 μm are formed.

Figure 5C:
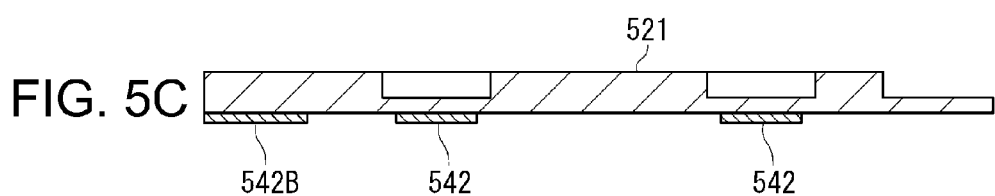

Thereafter, on the surface of the glass substrate (the movable substrate 52) on the side facing the fixed substrate 51, an ITO film is deposited by sputtering so as to have a thickness dimension of 0.1 μm under the set deposition conditions. A resist is applied onto the ITO film, pattern formation is performed by a photolithographic method and etching, and the resist is removed. Thus, as shown in FIG. 5C, the movable electrode 542, the movable extraction electrode 542A (not shown), and the movable electrode pad 542B are formed.

Figure 5D:
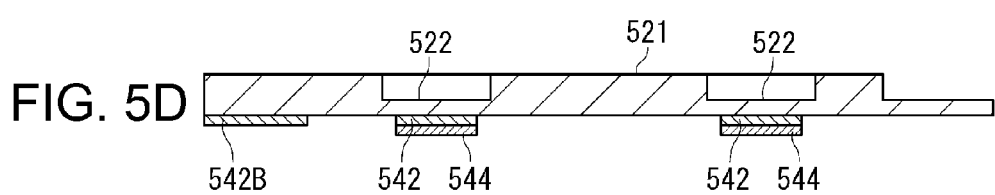

A metal mask or a silicon mask only exposing the movable electrode 542 is aligned with and bonded to the surface of the movable electrode 542 on the side of the fixed substrate 51, the movable insulating film 544 is deposited by an atomic layer deposition (ALD) method, and the mask is removed. As the movable insulating film 544, the high-k material described above is used. Thus, as shown in FIG. 5D, the movable insulating film 544 is formed on the surface of the movable electrode 542 on the side of the fixed substrate 51. Since the movable electrode 542 and the movable insulating film 544 deposited as described above satisfy the condition of the expression (2), the force F exerted on the movable substrate 52 by the internal stress of the movable electrode 542 is "0", and therefore the deflection of the movable substrate 52 is prevented.

Figure 5E:
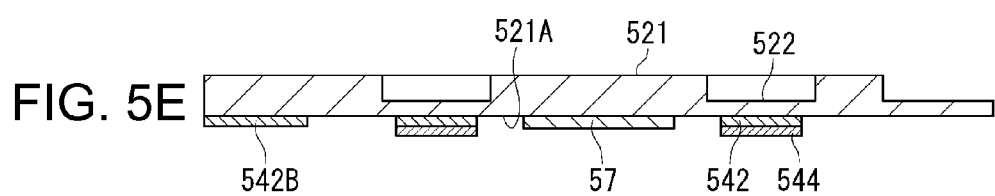

Thereafter, similarly to the fixed reflection film 56 of the fixed substrate 51, a liftoff process is performed through pattern formation by a photolithographic method and etching, and the movable reflection film 57 is deposited on the movable surface 521A of the movable portion 521 as shown in FIG. 5E.

Figure 5F:
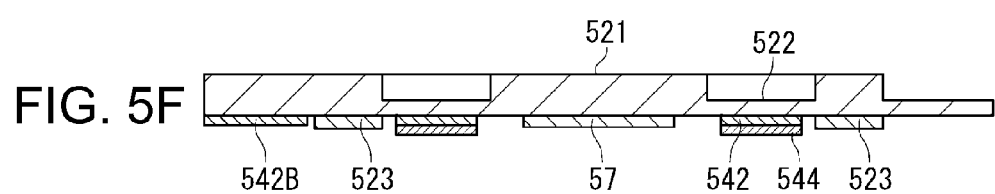

Further, similarly to the bonding portion 513 of the fixed substrate 51, a plasma-polymerized film using polyorganosiloxane is deposited on the bonding portion 523 of the movable substrate 52 so as to have a thickness dimension of 100 nm by a plasma CVD method, so that the bonding portion 523 is deposited as shown in FIG. 5F.

Figure 5G:
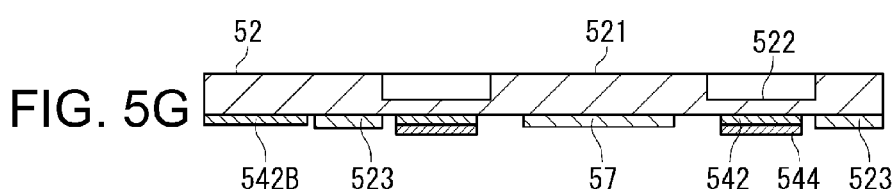

Then, a thin film of glass facing the fixed electrode pad 541B of the fixed substrate 51 is removed mechanically or chemically. Through the process described above, the movable substrate 52 without deflection due to the internal stress of the movable electrode 54 is formed as shown in FIG. 5G.

5-3. Bonding of Fixed Substrate with Movable Substrate

In bonding of the fixed substrate 51 with the movable substrate 52, a surface activation process for activating the bonding portion 513 of the fixed substrate 51 and the bonding portion 523 of the movable substrate 52 is carried out. In the surface activation process, the molecular binding on the surface of the bonding portion 513 or the bonding portion 523 is cut to generate the dangling bond which is not terminated. Specifically, $O_2$ plasma treatment or UV treatment is performed. In the case of $O_2$ plasma treatment, the treatment is carried out under the conditions of an $O_2$ flow rate of 30 cc/min, a pressure of 27 Pa, and an RF power of 200 W for 30 seconds. In the case of UV treatment, the treatment is carried out using an eximer UV laser (a wavelength of 172 nm) as a UV light source for 3 minutes.

After providing activation energy to the plasma-polymerized films, the two substrates are aligned with each other, and a load is applied to the substrates with the fixed bonding portion 513 and the movable bonding portion 523 placed one on top of the other, so that the substrates are bonded to each other.

In this case, since the deflection of the movable substrate 52 due to the internal stress of the movable electrode 542 is not caused, the deflections of the movable surface 521A and the movable reflection film 57 are also not caused. Accordingly, the fixed reflection film 56 and the movable reflection film 57 can be maintained parallel to each other, and a desired initial gap can be accurately set by controlling a pressure to be applied in pressure bonding.

6. Advantageous Effects of First Embodiment

In the etalon 5 of the embodiment as described above, the movable electrode 542 deposited on the movable substrate 52 has a compressive stress, and the movable insulating film 544 has a tensile stress. Therefore, the force exerted on the movable substrate 52 by the compressive stress of the movable electrode 542 and the force exerted on the movable substrate 52 by the tensile stress of the movable insulating film 544 are cancelled out each other, so that the force deflecting the movable substrate 52 is reduced. Therefore, the deflection of the movable substrate 52 is prevented, and the deflection of the movable reflection film 57 is also prevented. Accordingly, the accuracy of parallelism between the movable reflection film 57 and the fixed reflection film 56 can be favorably maintained, making it possible to improve the resolution of the etalon 5.

For the movable electrode 542 and the movable insulating film 544, the internal stress, thickness dimension, and area are set based on the expression (2).

Therefore, the force exerted on the movable substrate 52 by the compressive stress of the movable electrode 542 and the force exerted on the movable substrate 52 by the tensile stress of the movable insulating film 544 can be balanced, the deflection of the movable substrate 52 can be prevented more reliably, and the deflection of the movable reflection film 57 can be prevented.

As a material for forming the movable insulating film 544, a high-k material is used. Since a high-k material has a high relative dielectric constant, electrostatic attractive force can be improved and also dielectric strength is excellent. Accordingly, the gap can be accurately adjusted to a desired gap dimension, so that the resolution of the etalon 5 can be improved.

At the time of manufacturing the etalon 5, in the bonding step of bonding the fixed substrate 51 with the movable substrate 52, the plasma-polymerized film is irradiated with ultraviolet radiation to activate the surface of the plasma-polymerized film, and the fixed substrate 51 and the movable substrate 52 are placed on top of the other and bonded together by pressurizing at a predetermined pressure along the thickness direction. At this time, for example, when the movable substrate 52 or the movable reflection film 57 is deflected due to the internal stress of the movable reflection film 57, an initial gap dimension between the fixed reflection film 56 and the movable reflection film 57 is not uniform, making it hard to adjust the gap dimension to a desired set value. Moreover, in the etalon 5 in which the movable substrate 52 is deflected due to electrostatic attraction, the gap cannot be set to a value more than an initial gap. Therefore, when a set value of the initial gap is wrong, such inconvenience that light at a desired wavelength range cannot be dispersed is caused. Accordingly, when the movable substrate 52 or the movable reflection film 57 is deflected, the resolution is reduced, and in addition, it is necessary to set an initial gap to a larger one for manufacturing the etalon 5 which can disperse light at a desired wavelength range. Therefore, a driving voltage for moving the movable substrate 52 with electrostatic attraction is also increased, increasing power consumption.

In contrast, in the etalon 5 of the embodiment as described above, the deflection of the movable substrate 52 due to the movable electrode 542 is prevented, and the movable reflection film 57 and the fixed reflection film 56 can be maintained parallel to each other. Therefore, the initial gap between the reflection films 56 and 57 can be made uniform. Accordingly, the gap can be accurately adjusted to a desired gap dimension.

In this case, since it is no more necessary to set the gap to a value more than a desired gap dimension, a voltage value for driving the etalon 5 can also be reduced, making it possible to achieve power saving.

The movable substrate 52 of the embodiment includes the movable portion 521 on which the movable reflection film 57 is formed and the holding portion 522 which is formed to have a thickness dimension smaller than that of the movable portion 521 and has small rigidity relative to the thickness direction, and the movable electrode 542 is formed on the holding portion 522.

In the configuration having the movable portion 521 and the holding portion 522 disposed in this manner, it is possible to deflect the holding portion 522 with a small driving voltage to move the movable portion 521, compared to, for example, a parallel plate-shaped movable substrate without the holding portion 522, so that power saving can be achieved. Moreover, since the holding portion 522 easily deflects compared to the movable portion 521, the holding portion 522 greatly deflects when electrostatic attraction is applied to the movable substrate 52, and the deflection of the movable portion 521 is prevented. Thus, even when the movable substrate 52 is deflected to the side of the fixed substrate 51, the deflection of the movable surface 521A of the movable portion 521 can be prevented, and the deflection of the movable reflection film 57 can be prevented.

Accordingly, even when the movable substrate 52 is deflected to the side of the fixed substrate 51, the accuracy of parallelism between the reflection films 56 and 57 can be maintained, making it possible to prevent a reduction in resolution of the etalon 5.

The surface of the movable electrode 542 on the side of the fixed electrode 541 is covered with the movable insulating film 544, so that discharge between the fixed electrode 541 and the movable electrode 542 can be prevented. Therefore, when a driving voltage is applied between the fixed electrode 541 and the movable electrode 542, charges corresponding to the voltage value are held in each of the electrodes 541 and 542, so that the dimension of the gap between the fixed reflection film 56 and the movable reflection film 57 can be accurately controlled.

Second Embodiment

Next, a second embodiment of the invention will be described based on FIG. 6. In the following description, components similar to those of the first embodiment are denoted by the same reference and numeral signs, and the description thereof is omitted or simplified.

Figure 6:
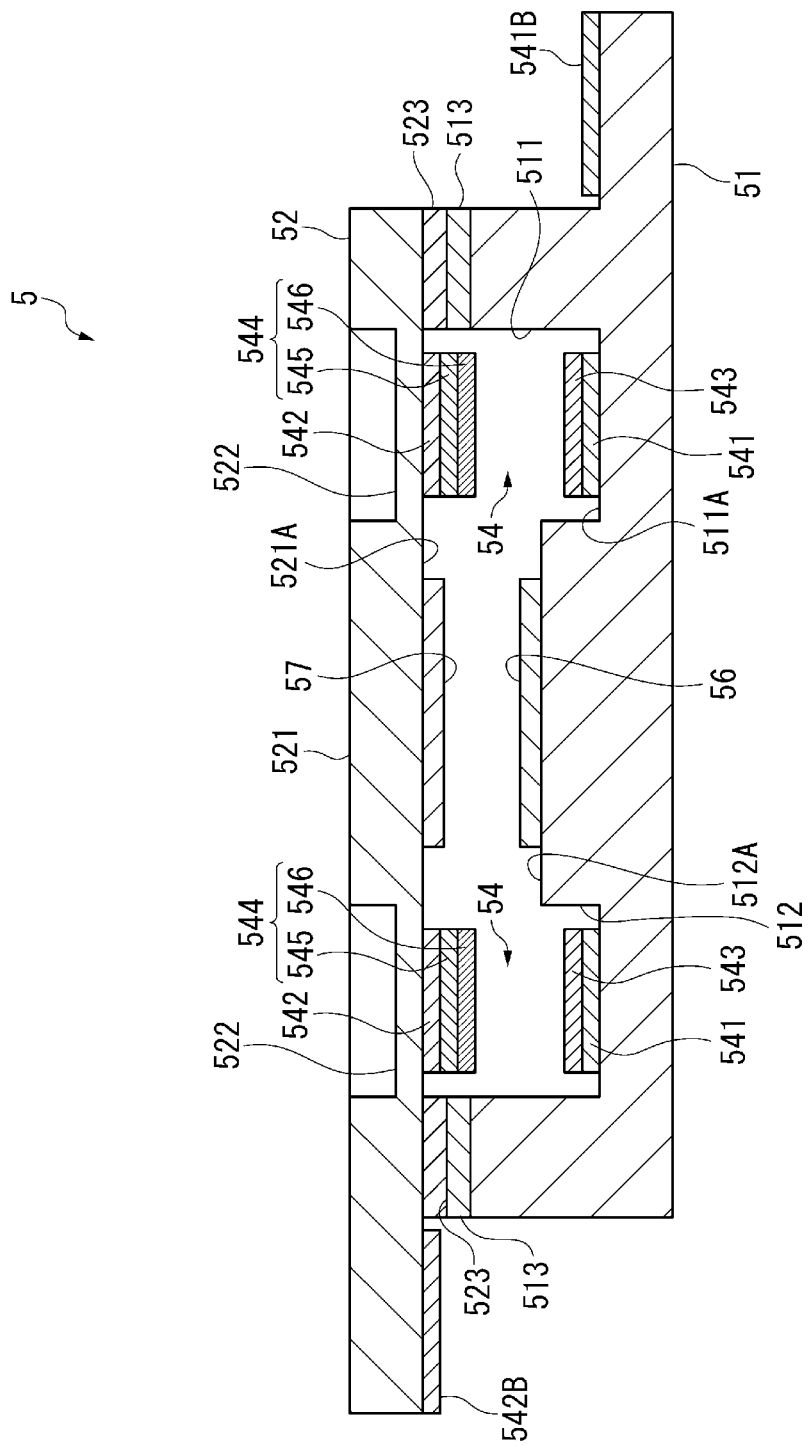
FIG. 6 is a cross-sectional view showing a schematic configuration of an etalon of a second embodiment according to the invention.

As shown in FIG. 6, the movable insulating film 544 of the etalon 5 of the second embodiment is composed of two layers, a first layer 545 and a second layer 546. The first layer 545 and the second layer 546 are configured such that the sum of the film stresses of the first layer 545 and the second layer 546 is a tensile stress for cancelling out a compressive stress of the movable electrode 542. That is, when $\sigma_2$ is the sum of the film stresses of the first layer 545 and the second layer 546 and $t_2$ is the sum of the film thickness dimensions of the first layer 545 and the second layer 546 in the expression (2), the relation of the expression (2) is satisfied.

The first layer 545 is formed of a $SiO_2$ film excellent in dielectric strength, and the second layer 546 is formed of a $HfO_2$ film having a high relative dielectric constant.

Advantageous Effects of Second Embodiment

In the etalon 5 of the second embodiment, the force exerted on the movable substrate 52 by the internal stress of the movable electrode 542 and the force exerted on the movable substrate 52 by the sum of the internal stresses of the first layer 545 and the second layer 546 are cancelled out each other, so that the force deflecting the movable substrate 52 is reduced. Therefore, the deflection of the movable substrate 52 is prevented, and the deflection of the movable reflection film is also prevented. Accordingly, the accuracy of parallelism between the movable reflection film 57 and the fixed reflection film 56 can be favorably maintained, making it possible to improve the resolution of the etalon 5.

Moreover, since the movable insulating film 544 is composed of a $SiO_2$ film excellent in dielectric strength and a $HfO_2$ film having a high relative dielectric constant, the movable insulating film 544 excellent in dielectric strength and electrostatic attractive force can be provided.

Other Embodiments

The invention is not limited to the embodiments. Modifications, improvements, and the like made within a range capable of achieving the advantage of some aspects of the invention are included in the invention.

For example, in the embodiments, the configuration in which the movable electrode 542 has a compressive stress and the movable insulating film 544 has a tensile stress is exemplified. However, a configuration in which the movable electrode 542 has a tensile stress and the movable insulating film 544 has a compressive stress may be adopted.

It is preferable to form, as the movable electrode 542, an ITO film having good adhesion to the movable substrate 52 made of glass. For example, by carrying out annealing treatment after deposition by sputtering, the movable electrode 542 made of ITO with a tensile stress can be formed. Deposition by sputtering tends to form a film having a compressive stress, while deposition using an evaporation method tends to form a film having a tensile stress. Accordingly, by depositing under predetermined evaporation conditions using an evaporation method, the movable electrode 542 made of ITO with a tensile stress may be formed.

When the movable electrode 542 has a tensile stress as described above, the movable insulating film 544 is configured to have a compressive stress. Therefore, the forces given to the movable substrate 52 by the internal stresses of the respective layers are cancelled out each other, so that the deflection of the movable substrate 52 can be reduced.

Although, in the second embodiment, the movable insulating film 544 is composed of two layers, the movable insulating film 544 may be composed of a plurality of layers with three layers or more. In this case, it is sufficient that the sum of the film stresses of the plurality of layers is a tensile stress for cancelling out the compressive stress of the movable electrode 542. Further, by using a combination of films having high dielectric strength and a high relative dielectric constant, the movable insulating film 544 excellent in dielectric strength and electrostatic attractive force can be provided.

Moreover, in the embodiments, the fixed insulating film 543 is formed on the surface of the fixed electrode 541 on the side of the movable electrode 542. However, a configuration in which the fixed insulating film 543 is not disposed may be adopted.

The movable substrate 52 is formed as the first substrate, and the fixed substrate 51 is formed as the second substrate. However, for example, a configuration may be adopted in which the fixed substrate 51 is formed as the first substrate, the fixed electrode 541 has a compressive stress, and the fixed insulating film 543 has a tensile stress. In this case, even when the fixed substrate 51 having a small thickness dimension is used, the deflection of the substrate due to the internal stress of the fixed electrode 541 can be prevented.

Then, a configuration may also be adopted in which a movable portion is disposed on both the fixed substrate 51 and the movable substrate 52 and these movable portions can displace relative to the thickness direction. In this case, a stacked structure may be adopted in which both the fixed electrode 541 and the movable electrode 542 have a compressive stress and their insulating films 543 and 544 each have a tensile stress.

Although, in the embodiments, an example of forming the holding portion 522 having a diaphragm shape in the movable substrate 52 is shown, the invention is not limited to this.

As the holding portion 522, any configuration may be adopted as long as the holding portion 522 holds the movable portion 521 such that the movable portion 521 can move forward and backward relative to the fixed substrate 51. For example, the holding portion 522 may be composed of a plurality of bridge portions. In this case, the movable electrode 542 is formed on all of the bridge portions or on the bridge portion disposed at a symmetrical position relative to the central point of the movable substrate 52. Thus, the deflection balance of the bridge portion can be made favorable, so that the movable portion 521 can be moved in a state where the movable reflection film 57 is maintained parallel to the fixed reflection film 56.

In the embodiments, the etalon 5 having the structure in which the dimension between the fixed reflection film 56 and the movable reflection film 57 facing each other is smaller than that between the fixed electrode 541 and the movable electrode 542 facing each other has been described. However, even an optical filter having a structure in which the dimension between a fixed reflection film and a movable reflection film is greater than that between a fixed electrode and a movable electrode provides effects similar to those of the embodiment.

As the electronic device according to the invention, the colorimetric device 1 has been exemplified. However, the tunable interference filter, optical module, and electronic device according to the invention can be used in various fields in addition to the colorimetric device 1.

For example, the invention can be used as a light-based system for detecting the presence of a specific substance. As such a system, for example, a gas detecting device, such as a vehicle-mounted gas leak detector which adopts a spectroscopic measurement method using the tunable interference filter of the invention to detect a specific gas with high sensitivity or an optoacoustic rare gas detector for breath test, can be exemplified.

An example of such a gas detecting device will be described based on the drawings.

Figure 7:
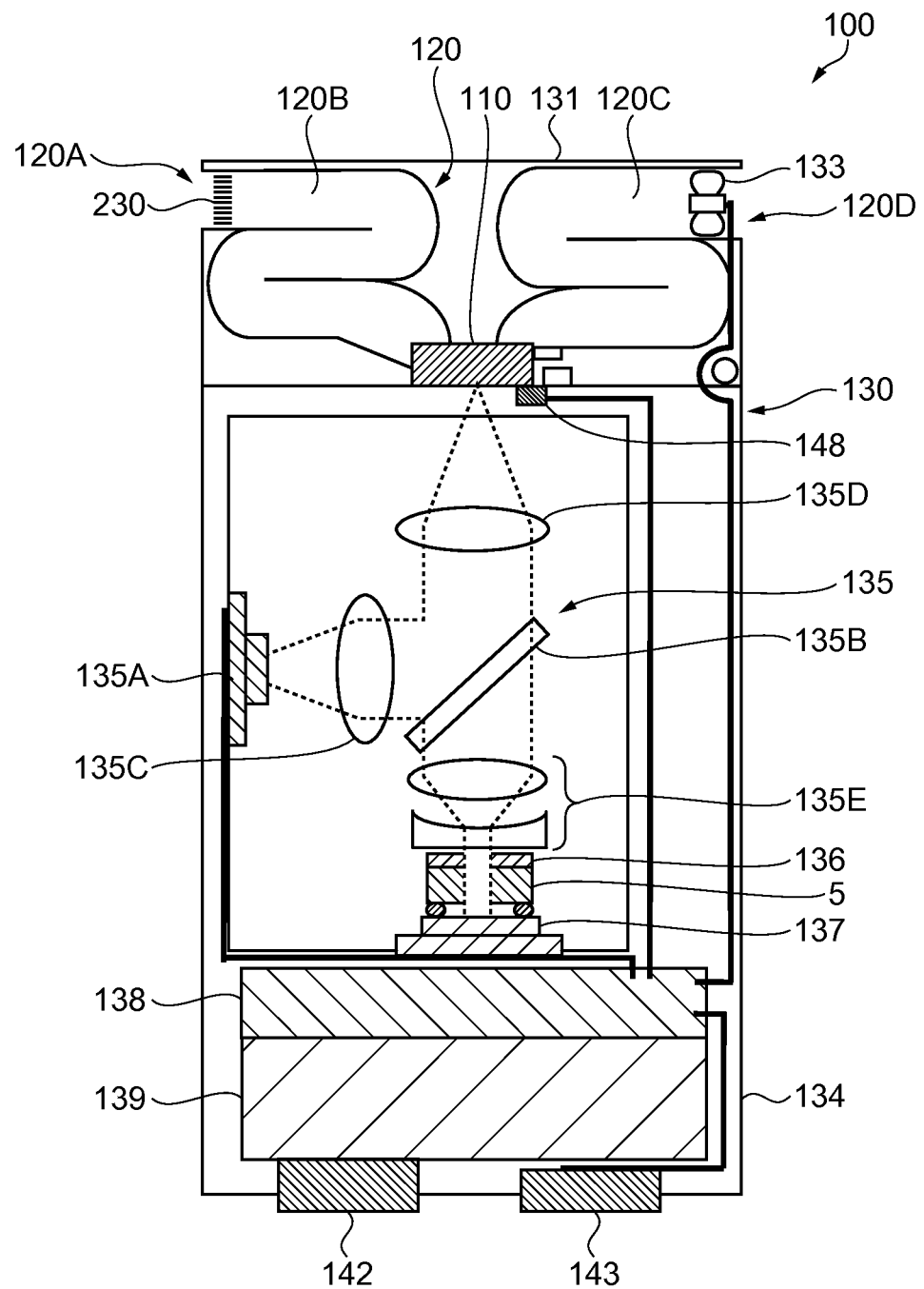
FIG. 7 is a schematic view showing a gas detecting device as an example of an electronic device of another embodiment according to the invention.

FIG. 7 is a schematic view showing an example of a gas detecting device including the tunable interference filter.

Figure 8:
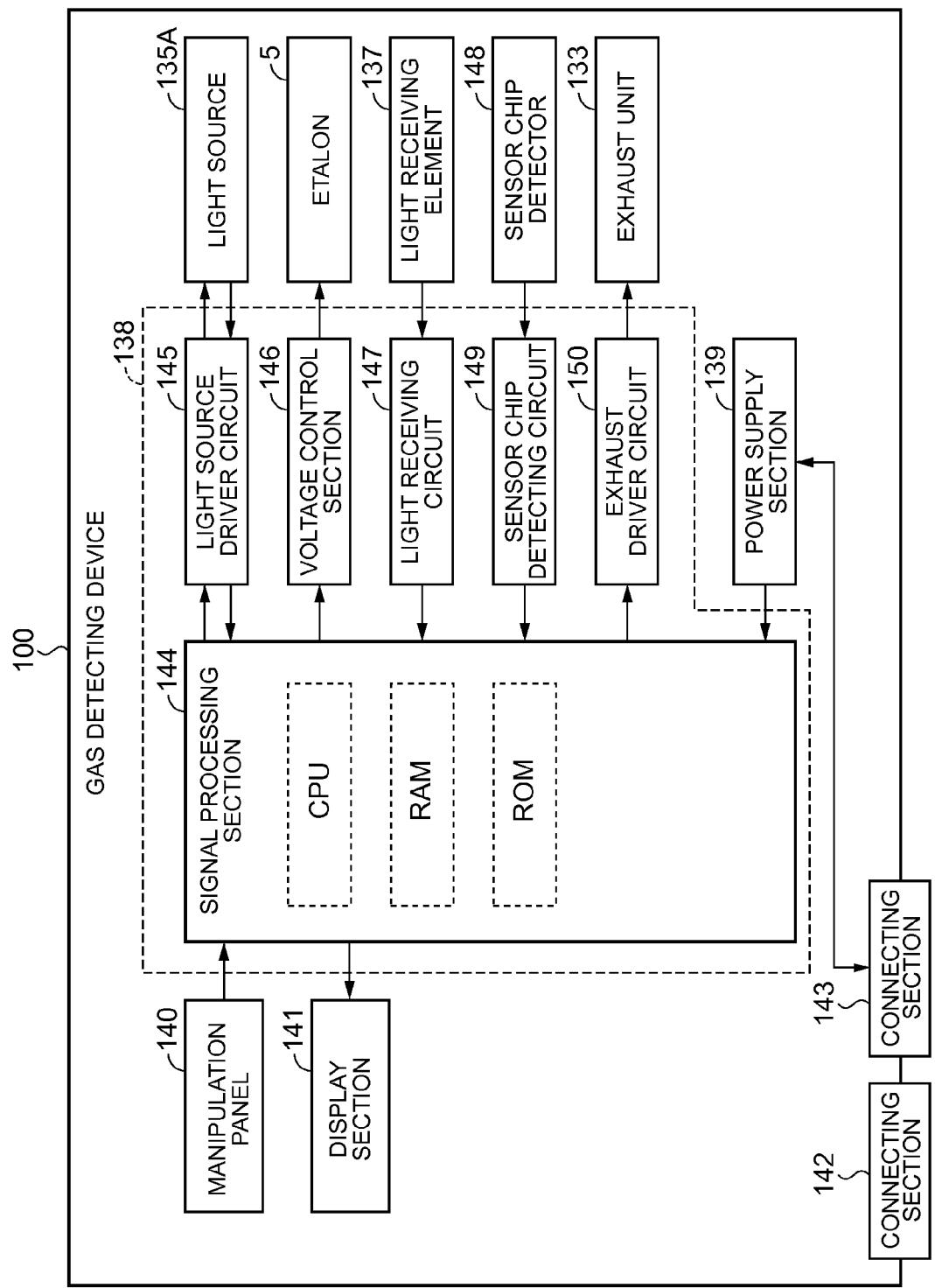
FIG. 8 is a block diagram showing a configuration of a control system of the gas detecting device.

FIG. 8 is a block diagram showing a configuration of a control system of the gas detecting device in FIG. 7.

The gas detecting device 100 is configured to include, as shown in FIG. 7, a sensor chip 110, a passage 120 including a suction port 120A, a suction passage 120B, an exhaust passage 120C, and an exhaust port 120D, and a main body portion 130.

The main body portion 130 is composed of a sensor section cover 131 having an opening capable of detaching the passage 120, an exhaust unit 133, a casing 134, an optical section 135, a detecting section (optical module) including a filter 136, the etalon 5 (tunable interference filter), and a light receiving element 137 (light receiving section), a control section 138 which processes a detected signal and controls the detecting section, a power supply section 139 which supplies power, and the like. The optical section 135 is composed of a light source 135A which emits light, a beam splitter 135B which reflects light incident from the light source 135A to the side of the sensor chip 110 and transmits the light incident from the side of the sensor chip to the side of the light receiving element 137, and lens 135C, 135D, and 135E.

Moreover, as shown in FIG. 8, a manipulation panel 140, a display section 141, a connecting section 142 for an interface to the outside, and the power supply section 139 are disposed on the surface of the gas detecting device 100. When the power supply section 139 is a secondary battery, a connecting section 143 for charging may be provided.

Further, the control section 138 of the gas detecting device 100 includes, as shown in FIG. 8, a signal processing section 144 composed of a CPU and the like, a light source driver circuit 145 for controlling the light source 135A, a voltage control section 146 for controlling the etalon 5, a light receiving circuit 147 which receives signals from the light receiving element 137, a sensor chip detecting circuit 149 which receives signals from a sensor chip detector 148 reading the code of the sensor chip 110 to detect the presence or absence of the sensor chip 110, and an exhaust driver circuit 150 which controls the exhaust unit 133.

Next, operation of the gas detecting device 100 described above will be described below.

Inside the sensor section cover 131 at the upper portion of the main body portion 130, the sensor chip detector 148 is disposed. The presence or absence of the sensor chip 110 is detected by the sensor chip detector 148. When the signal processing section 144 detects a detection signal from the sensor chip detector 148, the signal processing section 144 determines that the sensor chip 110 is mounted, and outputs a display signal causing the display section 141 to perform display indicating that detecting operation can be carried out.

When the manipulation panel 140 is manipulated by a user for example, and an instruction signal indicating to start a detecting process is output from the manipulation panel 140 to the signal processing section 144, the signal processing section 144 first outputs a signal for light source activation to the light source driver circuit 145 to activate the light source 135A. When the light source 135A is driven, a stable laser beam of linearly polarized light at a single wavelength is emitted from the light source 135A. The light source 135A has a temperature sensor or light amount sensor incorporated therein, and information of the sensor is output to the signal processing section 144. When the signal processing section 144 determines, based on the temperature or light amount input from the light source 135A, that the light source 135A is operating stably, the signal processing section 144 controls the exhaust driver circuit 150 to activate the exhaust unit 133. Thus, a gaseous sample including a target substance to be detected (gas molecules) is introduced from the suction port 120A, through the suction passage 120B, the interior of the sensor chip 110, and the exhaust passage 120C, to the exhaust port 120D.

Moreover, the sensor chip 110 is a sensor which has a plurality of metal nanostructures incorporated therein and utilizes localized surface plasmon resonance. In the sensor chip 110 described above, when an enhanced electric field is formed between the metal nanostructures by a laser beam, and gas molecules enter the enhanced electric field, Raman scattering light including information of molecular vibration, and Rayleigh scattering light are generated.

These Rayleigh scattering light and Raman scattering light pass through the optical section 135 and are incident on the filter 136. The Rayleigh scattering light is separated by the filter 136, and the Raman scattering light is incident on the etalon 5. Then, the signal processing section 144 controls the voltage control section 146 to adjust a voltage to be applied to the etalon 5 and causes the etalon 5 to disperse the Raman scattering light corresponding to gas molecules as a detection object. Thereafter, when the dispersed light is received by the light receiving element 137, a light receiving signal corresponding to the amount of the received light is output to the signal processing section 144 via the light receiving circuit 147.

The signal processing section 144 compares the thus obtained spectral data of the Raman scattering light corresponding to the gas molecules as a detection object with data stored in a ROM to determine whether or not the gas molecules are objective gas molecules, thereby specifying a substance. The signal processing section 144 causes the display section 141 to display information of the result or outputs the information of the result from the connecting section 142 to the outside.

In FIGS. 7 and 8, the gas detecting device 100 has been exemplified in which Raman scattering light is dispersed by the etalon 5 to perform gas detection based on the dispersed Raman scattering light. However, a gas detecting device which specifies the kind of gas by detecting the absorbance peculiar to the gas may be used. In this case, a gas sensor which allows the gas to flow into the inside of the sensor and detects light absorbed by the gas among incident light is used as the optical module according to the invention. Then, the gas detecting device which analyzes to determine the gas allowed by such a gas sensor to flow within the sensor is used as the electronic device according to the invention. Even with such a configuration, the component of gas can be detected using the tunable interference filter according to the invention.

As a system for detecting the presence of a specific substance, a substance component analyzing device, such as a non-invasive measurement device for sugar using near-infrared spectroscopy or a non-invasive measurement device for information on a food, living body, mineral, or the like, can be exemplified, without limiting to the detection of gas described above.

Hereinafter, a food analyzing device will be described as an example of the substance component analyzing device.

Figure 9:
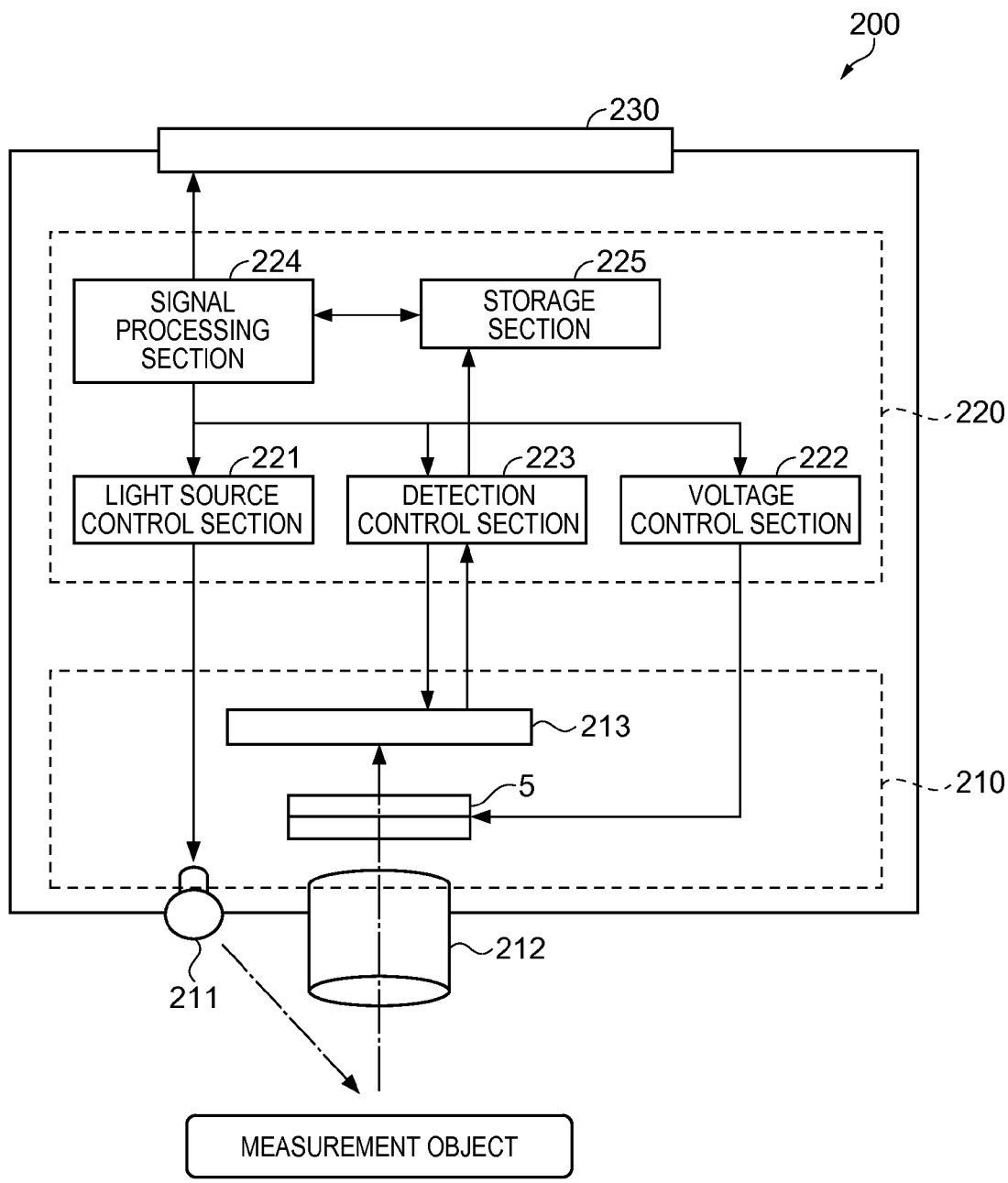
FIG. 9 is a schematic view showing a food analyzing device as an example of an electronic device of still another embodiment according to the invention.

FIG. 9 shows a schematic configuration of the food analyzing device as an example of an electronic device using the etalon 5.

As shown in FIG. 9, the food analyzing device 200 includes a detector 210 (optical module), a control section 220, and a display section 230. The detector 210 includes a light source 211 which emits light, an imaging lens 212 into which light from a measurement object is introduced, the etalon (tunable interference filter) which disperses the light introduced from the imaging lens 212, and an imaging section 213 (light receiving section) which detects the dispersed light.

The control section 220 includes a light source control section 221 which carries out the control of turning on and off of the light source 211 and the control of brightness during turning on, a voltage control section 222 which controls the etalon 5, a detection control section 223 which controls the imaging section 213 and acquires a spectral image imaged by the imaging section 213, a signal processing section 224, and a storage section 225.

In the food analyzing device 200, when the system is driven, the light source control section 221 controls the light source 211, so that a measurement object is irradiated with light from the light source 211. Then, the light reflected by the measurement object passes through the imaging lens 212 and is incident on the etalon 5. To the etalon 5, a voltage with which a desired wavelength can be dispersed is applied under the control of the voltage control section 222, and the dispersed light is imaged by the imaging section 213 composed of, for example, a CCD camera or the like. The imaged light is accumulated in the storage section 225 as a spectral image. The signal processing section 224 controls the voltage control section 222 to change the value of a voltage to be applied to the etalon 5 and acquires a spectral image corresponding to each wavelength.

The signal processing section 224 performs arithmetic processing on data of each pixel in each of the images accumulated in the storage section 225 to obtain a spectrum in each pixel. In the storage section 225, for example, information on food components corresponding to spectra is stored. The signal processing section 224 analyzes data of the obtained spectrum based on the food information stored in the storage section 225 to obtain the food component and content included in the detection object. Moreover, the food calorie, freshness, and the like can also be calculated based on the obtained food component and content. Further, by analyzing the spectrum distribution in the image, extraction and the like of a portion whose freshness is reduced in the food to be tested can also be carried out, and further, detection of a foreign substance and the like included in the food can also be carried out.

Then, the signal processing section 224 performs a process for causing the display section 230 to display the thus obtained information, such as the component, content, calorie, and freshness, of the food to be tested.

Although the food analyzing device 200 is exemplified in FIG. 9, the invention can also be used, with a configuration substantially similar to that of the food analyzing device 200, as a non-invasive measurement device for the other information described above. For example, the invention can be used as a bioanalytical device which analyzes biological components for the measurement or analysis of body fluid components such as blood. As such a bioanalytical device, for example, when a device is configured to detect ethyl alcohol as a device for measuring body fluid components such as blood, the device can be used as a drunk driving prevention device which detects a drinking state of a driver. Moreover, the invention can be used as an electronic endoscope system including such a bioanalytical device.

Further, the invention can be used as a mineral analyzing device which carries out component analysis of minerals.

Further, the tunable interference filter, optical module, electronic device according to the invention can be applied to devices described below.

For example, by changing the intensity of light at each wavelength, data can be transmitted via light at each wavelength. In this case, light at a specific wavelength is dispersed by the tunable interference filter disposed in the optical module, and the dispersed light is received by a light receiving section, so that data transmitted via the light at the specific wavelength can be extracted. By processing the data of the light at each wavelength with an electronic device including such an optical module for data extraction, optical communication can also be implemented.

As an electronic device, the invention can also be applied to a spectral camera which images a spectral image, a spectrum analyzer, and the like by dispersing light with the tunable interference filter according to the invention. An example of such a spectral camera is an infrared camera having the tunable interference filter incorporated therein.

Figure 10:
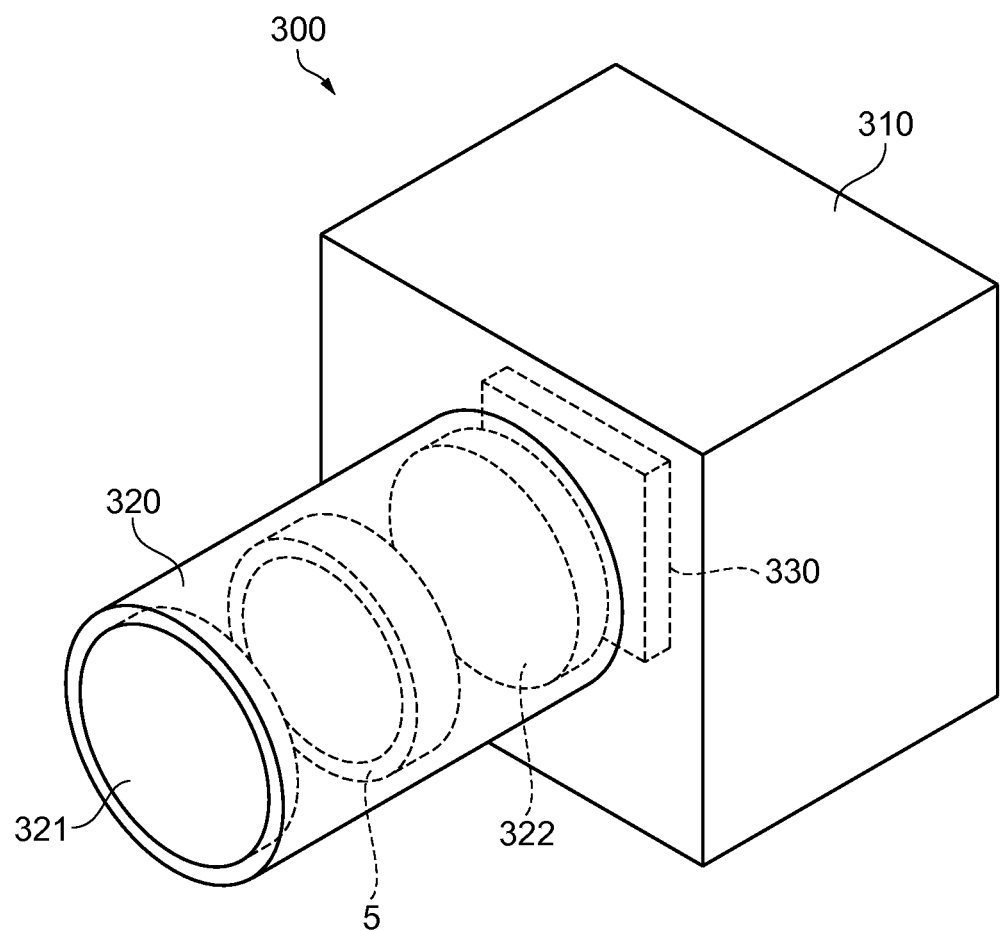
FIG. 10 is a schematic view showing a spectral camera as an example of an electronic device of further another embodiment according to the invention.

FIG. 10 is a schematic view showing a schematic configuration of a spectral camera. As shown in FIG. 10, the spectral camera 300 includes a camera main body 310, an imaging lens unit 320, and an imaging section 330.

The camera main body 310 is a portion gripped and manipulated by a user.

The imaging lens unit 320 is disposed on the camera main body 310 and introduces incident image light to the imaging section 330. As shown in FIG. 10, the imaging lens unit 320 is configured to include an objective lens 321, an imaging lens 322, and the etalon 5 disposed between the lenses.

The imaging section 330 is composed of a light receiving element and images image light introduced by the imaging lens unit 320.

In the spectral camera 300 described above, light at a wavelength to be imaged is transmitted by the etalon 5, so that a spectral image of the light at a desired wavelength can be imaged.

Further, the tunable interference filter according to the invention may be used as a band-pass filter. For example, the invention can also be used as an optical laser device which disperses and transmits, with the tunable interference filter, only light in a narrow-band centered at a predetermined wavelength among light in a predetermined wavelength range emitted by a light emitting element.

Moreover, the tunable interference filter according to the invention may be used as a biometric authentication device. For example, the tunable interference filter according to the invention can be applied to an authentication device for vein, fingerprint, retina, iris, and the like using light in a near-infrared region or in a visible region.

Further, the optical module and the electronic device can be used as a concentration detecting device. In this case, infrared energy (infrared light) emitted from a substance is dispersed by the tunable interference filter for analysis to measure the concentration of a test object in a sample.

As shown in the above description, the tunable interference filter, optical module, and electronic device according to the invention can be applied to any device which disperse predetermined light among incident light. As described above, since the tunable interference filter according to the invention can disperse a plurality of wavelengths with one device, the measurement of spectra of a plurality of wavelengths and the detection for a plurality of components can be accurately carried out. Accordingly, compared to a related-art device which extracts a desired wavelength with a plurality of devices, miniaturization of an optical module or an electronic device can be promoted, and therefore, the invention can be preferably used as, for example, a portable or vehicle-mounted optical device.

In addition, a specific structure and procedure in carrying out the invention can be appropriately changed to another structure and the like within a range capable of achieving the advantage of the invention.

The entire disclosure of Japanese Patent application No. 2011-031847, filed Feb. 17, 2011 is expressly incorporated by reference herein.

What is claimed is:

1. A tunable interference filter comprising:
a first substrate;
a second substrate facing the first substrate;
a first reflection film disposed on a surface of the first substrate, the surface facing the second substrate;
a second reflection film disposed on a surface of the second substrate and facing the first reflection film via a gap, the surface facing the first substrate;
a first electrode disposed on the surface of the first substrate, the surface facing the second substrate;
a second electrode disposed on the surface of the second substrate and facing the first electrode via a gap, the surface facing the first substrate; and
an insulating film stacked directly on a surface of the first electrode opposite to the surface of the first substrate,
wherein a direction of an internal stress of the first electrode relative to a plane direction along a substrate surface of the first substrate is opposite to a direction of an internal stress of the insulating film relative to the plane direction; and
wherein an area of the insulating film is equal to or less than an area of the first electrode in a plane view.

2. The tunable interference filter according to claim 1, wherein
the absolute value of the product of the internal stress, film thickness dimension, and area of the first electrode is the same as that of the product of the internal stress, film thickness dimension, and area of the insulating film.

3. The tunable interference filter according to claim 1, wherein
the insulating film is a film made of a high-k material.

4. The tunable interference filter according to claim 1, wherein
the insulating film is formed of a plurality of layers.

5. An optical module comprising:
the tunable interference filter according to claim 1; and
a detecting section which detects light transmitted through the tunable interference filter.

6. An electronic device comprising the optical module according to claim 5.

7. A tunable interference filter comprising:
a first substrate;
a second substrate facing the first substrate;
a first reflection film disposed on a surface of the first substrate, the surface facing the second substrate;
a second reflection film disposed on a surface of the second substrate and facing the first reflection film via a gap, the surface facing the first substrate;
a first electrode disposed on the surface of the first substrate, the surface facing the second substrate;
a second electrode disposed on the surface of the second substrate and facing the first electrode via a gap, the surface facing the first substrate; and
an insulating film stacked directly on a surface of the first electrode in a direction away from the surface of the first substrate,
wherein a direction of an internal stress of the first electrode relative to a plane direction along a substrate surface of the first substrate is opposite to a direction of an internal stress of the insulating film relative to the plane direction; and
wherein an area of the insulating film is equal to or less than an area of the first electrode in a plane view.

* * * * *